(No Model.)
G. F. PAGE.
BELTING.
No. 394,503. Patented Dec. 11, 1888.
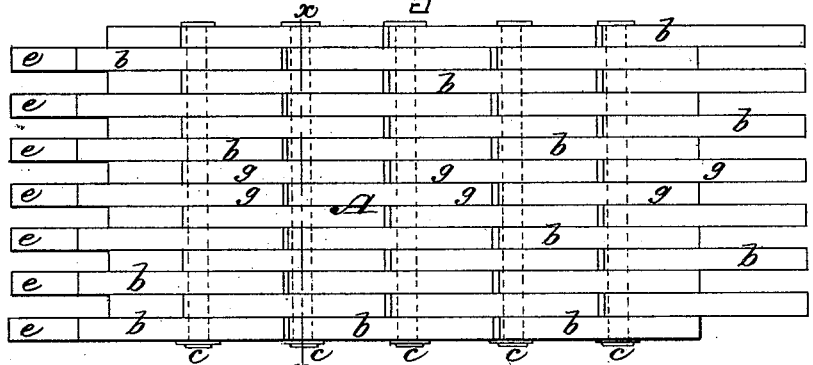
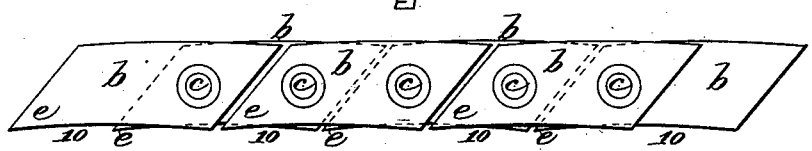
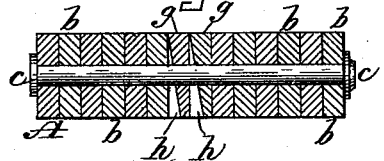
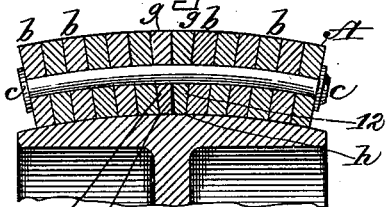
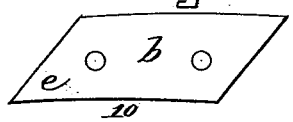
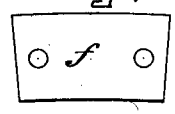
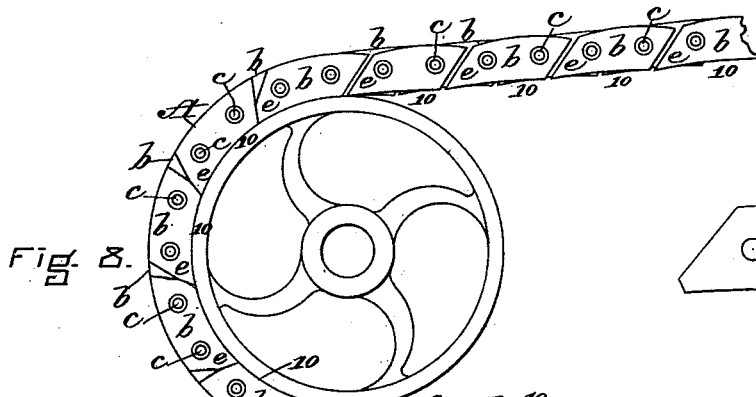
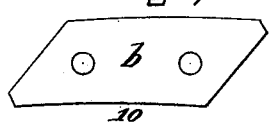
WITNESSES.
Edwin F. Cadgett
Ferdinand V. Hayden
INVENTOR.
Geo. F. Page
By R. E. Teschemacher
Atty.
N. PETERS, Photo-Lithographer, Washington, D. C.

UNITED STATES PATENT OFFICE.

GEORGE F. PAGE, OF CONCORD, NEW HAMPSHIRE.

BELTING.

SPECIFICATION forming part of Letters Patent No. 394,503, dated December 11, 1888.

Application filed November 14, 1887. Serial No. 255,176. (No model.)

*To all whom it may concern:*

Be it known that I, GEORGE F. PAGE, a citizen of the United States, residing at Concord, in the county of Merrimac and State of New Hampshire, have invented certain new and useful Improvements in Machine-Belting composed of Links of Leather or other Suitable Flexible Substance, of which the following is a full, clear, and exact description, reference being had to the accompanying drawings, making part of this specification, in which—

Figure 1 is a plan of a piece of leather-link belting constructed in accordance with my invention. Fig. 2 is a side elevation of the same. Fig. 3 is a transverse vertical section on the line $x\,x$ of Fig. 1. Fig. 4 is a similar section of the belt upon the rim of a pulley, illustrating the construction whereby lateral flexure of the belt is permitted to allow it to conform to the "crowning" or transverse curvature of the face of the pulley. Fig. 5 is a side elevation of one of the rhomboidal links of which the belt is composed. Fig. 6 is an enlarged vertical section of one of the central links of the belt, illustrating the manner in which it is chamfered or beveled on its side to permit lateral flexure of the belt. Fig. 7 is a side elevation of one of the shorter links, which I may employ at intervals to form air spaces or apertures in the belt. Fig. 8 is a side elevation representing my belting around a pulley. Fig. 9 is a side elevation of a link of slightly-modified construction.

My invention relates to that class of machine-belts which are composed of links, usually made from leather, but sometimes of rubber or other flexible material, secured together by transverse rods or bolts passing through holes at the opposite ends of said links, which are so arranged that each link passes by the space between the two adjacent links on each side thereof, so as to break joints. These leather links have heretofore been made of substantially oblong form with rounded ends to allow them to vibrate slightly upon the bolts by which the links are connected together, thus leaving a space between the ends of each two adjoining links in the same longitudinal line, whereby the continuity of the bearing or contact-surface of the belt was broken at frequent intervals over its entire area, and its frictional hold upon the pulley thereby correspondingly diminished.

My invention has for its object to overcome this disadvantage and to provide a continuous bearing or contact of the belt with the pulley over the entire area of that portion of the belt running over the said pulley, whereby a maximum frictional hold of the belt upon the pulley is secured.

To this end my invention consists in a driving-belt composed of links of leather or other suitable flexible material, made of substantially rhomboidal form, and arranged so that the lower acute-angled end of one link will extend under the corresponding beveled end of the next link in the same longitudinal line, a sufficient space being left between each two links, when the belt is stretched in a straight line, to allow them to vibrate slightly on their connecting-bolts, by which construction, as the belt passes around a pulley, the lower sharp-pointed or acute-angled end of each link is brought into contact with the correspondingly-beveled end of the adjoining link, thus closing up the space or gap between the two along the lower edge and forming a continuous bearing-surface, whereby the entire area of that portion of the belt passing over the pulley is brought into contact therewith.

My invention also consists in a novel construction whereby lateral flexure of the belt is permitted, to enable it to conform transversely to the crowning shape of the rim of the pulley on which it is run, as hereinafter more particularly set forth; and my invention also consists in certain other novel features and combinations of parts, as will be hereinafter particularly set forth, and specifically pointed out in the claims.

In the said drawings, A represents my improved belt, composed of links $b$, of leather or other suitable flexible material. In practice I prefer to use what is known as "mechanically-made rawhide," either purely such or tanned a little on the surface, and having the inner portion treated by machinery, and known as "mechanically-made rawhide leather with a tanned surface." Each of these links $b$ is of substantially rhomboidal form, as seen in Figs. 2 and 5, and is provided with two holes—one near each end—for the passage of the transverse bolts $c$, by means of which the said links are connected together to form the belt, the links being arranged in such manner that the center of each link of one longitudinal row is opposite to the joint or line of division between the two adjoining links of the next longitudinal row. The bolts or pins $c$ have each a head at one end, and are provided at the opposite end with a washer, on which the end of the bolt is riveted; or, if preferred, each end of the bolt may be riveted on a washer. The angular ends of two adjoining links are arranged as shown, extending the one under the other, with sufficient space between them, when the belt is stretched in a straight line, to allow of their vibrating slightly on the bolts $c$, and as the belt passes around the pulley the lower beveled corner, $e$, of each link, which forms an acute angle, is brought up closely against the correspondingly-beveled end of the adjoining link, as seen in Fig. 8, thus closing up what would otherwise be a gap or space at the line of contact with the pulley, and making the contact with the pulley continuous. The flexibility of the angular corner $e$ of the link enables it to adjust itself perfectly to the curvature of the circumference of the pulley; but to still further assure the contact of the link with the pulley, I preferably make the inner edge, 10, of the link slightly concave, as shown, the curve upon which it is cut agreeing exactly or approximately with the curvature of the circumference of the pulley upon which the belt is to be run. The opposite or outer edge of the link may be curved so as to be parallel with the inner edge; but this is immaterial, and the outer or upper edge of the link may be made either straight, concave, or convex, as preferred. I prefer to make each link with two acute angles, as seen in Figs. 2 and 5, as it makes the belt more complete and continuous; but instead of acute angles the sharp-pointed ends may be cut away slightly, as seen in Fig. 9, without any injurious effect, except that the contact of the under side of the belt with the pulley would not be so complete, and hence not so desirable.

The links may be of any suitable length or width, and they may be even wider than they are long, so as to be substantially rhomboidal in the opposite direction to that shown in the drawings. If it should be desired to leave spaces or apertures between the links, so that the air may pass through the belt as it comes in contact with the pulley, this may be accomplished by the employment of a few links, $f$, of substantially the form seen in Fig. 7, which links may be introduced as frequently as may be desired, and thus scattered among the other links, $b$, which principally make up the belt.

In order to secure the necessary lateral flexure of the belt to enable it to conform to the crowning shape or transverse curvature of the rim of the pulley, I arrange along the line of the center of the belt one or more longitudinal rows of links, $g$, chamfered off or beveled on one or both sides, whereby they are made of substantially V shape in transverse section, as seen at 12, in Figs. 4 and 6, and when these V-shaped links are used the transverse bolts $c$ are made of flexible metal to enable them to bend slightly, so that it will be obvious that the spaces $h$, formed between the beveled sides of the V-shaped links $g$ and the sides of those adjoining, will allow the belt to have a sufficient amount of lateral flexure to conform to the crowning surface of any pulley over which it may be run, thus making complete contact from side to side. I prefer to use for this purpose copper bolts of suitable size and strength, but flexible bolts of any other suitable metal may be used. For very narrow belts, or those intended to run on flat-faced pulleys, these V-shaped links would not be required, and in such case the bolts need not be made flexible, but may be made rigid, as heretofore.

I do not confine myself to placing the longitudinal row or rows of V-shaped links $g$ along the line of the center of the belt, as they may be placed on either side of said center line, and in case of very wide belts there may be two or more longitudinal lines of such V-shaped links, if such shall be found desirable.

It will be seen that my improved belt presents many advantages over flexible-link belts as hitherto constructed, as it is of exceedingly simple construction, there being no complicated joints along the center to allow of lateral flexure, while the contact is complete upon the surface of the pulley, both in its transverse and longitudinal sections, whereby a maximum frictional hold of the belt upon the pulley is secured without any unnecessary complication of parts.

What I claim as my invention, and desire to secure by Letters Patent, is—

1. A driving-belt composed of flexible links of rhomboidal form, connected by bolts and having one or more longitudinal rows of links of V shape in transverse section, whereby the belt is caused to conform to the crowning surface of the pulley over which it runs, substantially as herein described.

2. A driving-belt composed of flexible links of rhomboidal form, connected by flexible transverse bolts or pins, and having one or more longitudinal rows of links of V shape in transverse section, whereby the belt is caused to conform to the crowning surface of the pulley over which it runs, substantially as set forth.

Witness my hand this 10th day of November, A. D. 1887.

GEO. F. PAGE.

In presence of—
 P. E. TESCHEMACHER,
 EDWIN F. EDGETT.